(12) United States Patent
Frank et al.

(10) Patent No.: US 9,694,801 B2
(45) Date of Patent: Jul. 4, 2017

(54) COMPRESSED AIR SUPPLY INSTALLATION AND PNEUMATIC SYSTEM

(75) Inventors: Dieter Frank, Hannover (DE); Frank Meissner, Hannover (DE); Uwe Stabenow, Laatzen (DE)

(73) Assignee: WABCO GMBH, Hannover (DE)

( * ) Notice: Subject to any disclaimer, the term of this patent is extended or adjusted under 35 U.S.C. 154(b) by 835 days.

(21) Appl. No.: 13/993,839

(22) PCT Filed: Nov. 22, 2011

(86) PCT No.: PCT/EP2011/005863
§ 371 (c)(1),
(2), (4) Date: Jun. 13, 2013

(87) PCT Pub. No.: WO2012/079688
PCT Pub. Date: Jun. 21, 2012

(65) Prior Publication Data
US 2013/0255787 A1     Oct. 3, 2013

(30) Foreign Application Priority Data

Dec. 16, 2010   (DE) ..................... 10 2010 054 712

(51) Int. Cl.
*B60T 13/68*     (2006.01)
*B60T 17/20*     (2006.01)
(Continued)

(52) U.S. Cl.
CPC .......... *B60T 13/683* (2013.01); *B60G 17/052* (2013.01); *B60G 17/0523* (2013.01);
(Continued)

(58) Field of Classification Search
CPC .... B60T 13/683; B60T 17/02; B60T 17/0523; B60T 17/004; B60G 2500/2021; B60G 2500/2012; Y10T 137/264
See application file for complete search history.

(56) References Cited

U.S. PATENT DOCUMENTS 4,756,548 A     7/1988   Kaltenthaler et al.
4,809,957 A *   3/1989   Schonfeld .......... B60G 17/0408
                                                    267/64.11
(Continued)

FOREIGN PATENT DOCUMENTS

DE      32 16 329 C2    11/1983
DE      35 33 893 A1     3/1987
(Continued)

*Primary Examiner* — Atif Chaudry
(74) *Attorney, Agent, or Firm* — Leydig, Voit & Mayer, Ltd.

(57) ABSTRACT

A compressed air supply device for operating a pneumatic installation comprises an air supply unit configured to supply air, an air compression unit configured to compress air, a bleeding line comprising a controllable solenoid valve arrangement, the solenoid valve arrangement having a magnetic part and a pneumatic part, and a bleeding port configured to bleed air. The device also comprises a compressed air supply line having an air drier and a compressed air port, the compressed air supply line being configured to supply the pneumatic installation with compressed air, wherein the pneumatic part is open when the magnetic part is not activated.

51 Claims, 7 Drawing Sheets

(51) Int. Cl.
  *B60G 17/052* (2006.01)
  *B60T 17/00* (2006.01)
  *B60T 17/02* (2006.01)

(52) U.S. Cl.
  CPC ............ *B60T 17/004* (2013.01); *B60T 17/02* (2013.01); *B60G 2300/07* (2013.01); *B60G 2500/2012* (2013.01); *B60G 2500/2021* (2013.01); *B60G 2500/2044* (2013.01); *B60G 2600/22* (2013.01); *B60G 2600/26* (2013.01); *Y10T 137/0318* (2015.04); *Y10T 137/264* (2015.04); *Y10T 137/87265* (2015.04)

(56) References Cited

U.S. PATENT DOCUMENTS

| | | | |
|---|---|---|---|
| 6,074,177 A | 6/2000 | Kobayashi et al. | |
| 6,098,967 A | 8/2000 | Folchert | |
| 6,540,308 B1 | 4/2003 | Hilberer | |
| 6,694,933 B1 * | 2/2004 | Lester | F01L 13/0031 123/198 F |
| 6,698,778 B2 | 3/2004 | Roemer et al. | |
| 6,726,224 B2 | 4/2004 | Jurr et al. | |
| 6,824,145 B2 * | 11/2004 | Behmenburg | B60C 23/10 152/416 |
| 7,255,358 B2 * | 8/2007 | Kim | B60G 17/0155 280/124.157 |
| 7,832,813 B2 | 11/2010 | Bensch et al. | |
| 8,290,679 B2 | 10/2012 | Bensch et al. | |
| 8,297,714 B2 | 10/2012 | Bensch et al. | |
| 8,708,430 B2 | 4/2014 | Bensch et al. | |
| 8,794,718 B2 | 8/2014 | Bensch et al. | |
| 2001/0050347 A1 * | 12/2001 | Otsuka | B60T 8/363 251/129.15 |
| 2004/0055564 A1 * | 3/2004 | Crowell | F02B 75/02 123/316 |
| 2009/0127926 A1 * | 5/2009 | Fries | B60T 17/02 303/15 |

FOREIGN PATENT DOCUMENTS

| | | |
|---|---|---|
| DE | 35 42 974 A1 | 6/1987 |
| DE | 39 19 438 A1 | 12/1990 |
| DE | 19700243 C1 | 4/1998 |
| DE | 197 24 747 | 6/1998 |
| DE | 199 11 933 B4 | 9/1999 |
| DE | 198 21 420 C1 | 10/1999 |
| DE | 19835638 A1 | 2/2000 |
| DE | 100 55 108 A1 | 5/2002 |
| DE | 10 2006 036 748 B1 | 2/2008 |
| DE | 10 2006 014 012 A1 | 3/2008 |
| DE | 10 2006 041 008 A1 | 3/2008 |
| DE | 10 2006 041 010 A1 | 3/2008 |
| DE | 10 2007 008 504 A1 | 8/2008 |
| DE | 10 2007 051 150 A1 | 11/2008 |
| DE | 10 2007 050 151 A1 | 4/2009 |
| DE | 10 2008 007 877 B3 | 11/2009 |
| EP | 1 165 333 B2 | 1/2002 |
| EP | 1 233 183 B1 | 8/2002 |
| EP | 1 386 811 B1 | 2/2004 |
| EP | 1508488 A1 | 2/2005 |
| EP | 2 338 754 B1 | 6/2011 |

* cited by examiner

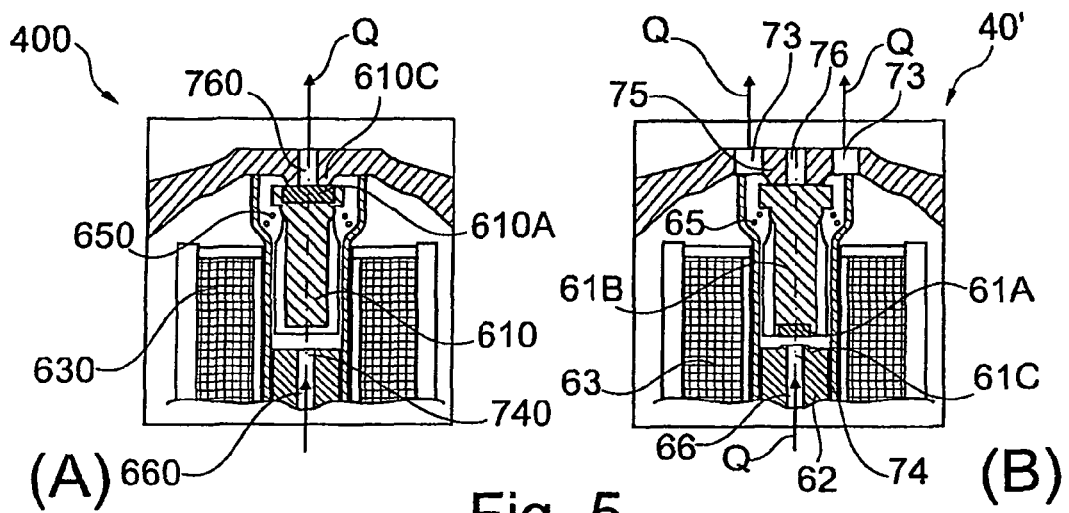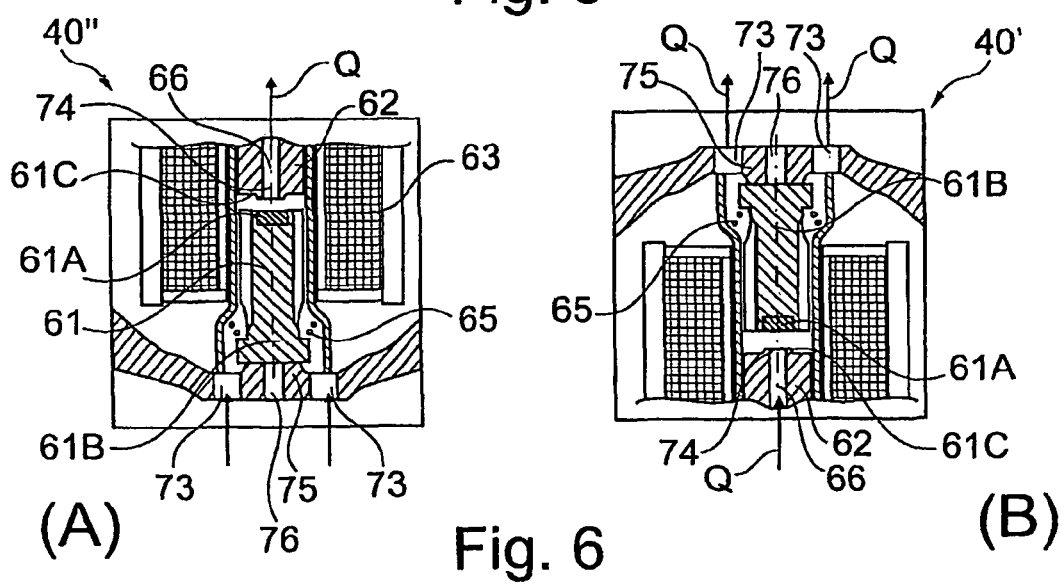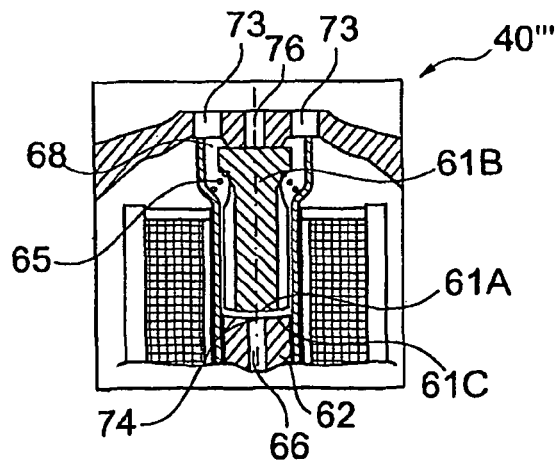
Fig. 5
Fig. 6
Fig. 7

COMPRESSED AIR SUPPLY INSTALLATION AND PNEUMATIC SYSTEM

FIELD OF THE INVENTION

The present invention generally relates to embodiments of a compressed air supply device and method for a pneumatic system with a pneumatic installation, such as an air suspension installation.

BACKGROUND OF THE INVENTION

A compressed air supply device is used in vehicles of all types, in particular, to supply compressed air to a vehicle air suspension installation. Air suspension installations may comprise level control devices, with which the spacing between the vehicle axle and the vehicle body can be adjusted. An air suspension installation comprises a number of air bellows, which are pneumatically connected to a common line (i.e., a gallery), can lift the vehicle body when increasingly filled, and can accordingly lower the vehicle body when decreasingly filled. With growing spacing between the vehicle axle and the vehicle body or ground clearance, the suspension travels are longer, and greater ground unevenness can also be overcome without resulting in contact with the vehicle body. Such systems are used in off-road vehicles and sport utility vehicles (SUVs). In particular, in the case of SUVs with powerful engines, it is desirable to provide the vehicle with relatively small ground clearance for high speeds on the road and also with a relatively large ground clearance for off-road. It is also desirable to change the ground clearance as quickly as possible, which increases the demands, in terms of speed, flexibility, and reliability of a compressed air supply device.

A compressed air supply device for use in a pneumatic system comprising a pneumatic installation (for example, an air suspension installation as previously described) is operated with compressed air from a compressed air supply unit, for example, within the scope of a pressure level from 5 to 20 bar. The compressed air is made available to the compressed air supply unit by means of an air compression unit (e.g., a compressor). The compressed air supply unit is pneumatically connected to a compressed air port in order to supply the pneumatic installation and is also pneumatically connected to a bleeding port. The compressed air supply device an be bled toward the bleeding port via a bleeding valve arrangement by draining air.

To ensure long-term operation of the compressed air supply device, the device has an air dryer, with which the compressed air is to be dried. The collection of moisture in the pneumatic system is thus avoided, which, at comparatively low temperatures, may lead to valve-damaging crystal formation and undesired defects in the compressed air supply device and in the pneumatic installation. An air dyer has a drying means, normally a granulate packed bed, through which the compressed air can flow so that the granulate packed bed (at comparatively high pressure), by means of adsorption, can take on moisture contained in the compressed air. An air dryer may optionally be designed as a regenerative air dryer. This is achieved as a result of the fact that, during each bleeding cycle (at comparatively low pressure), the dried compressed air from the air suspension system flows through the granulate packed bed in counter flow or co-current flow relative to the filling direction. The bleeding valve arrangement can be opened for this purpose. For such an application (also referred to as pressure swing adsorption), it has proven to be desirable to design a compressed air supply device in a versatile and reliable manner, in particular, to enable relatively quick bleeding with a pressure swing that is still sufficient for regeneration of the air dryer.

A compressed air supply device of the type mentioned above for a vehicle level control device and air suspension systems is known (see DE 35 429 74 A1), with which a predefined spacing of the vehicle frame from the vehicle axle can be maintained in accordance with the vehicle load by filling up or emptying the air suspensions. The device contains a normally closed solenoid bleeding valve and a safety valve controllable by the pressure in the air suspensions. Such a compressed air supply device can be improved further.

DE 199 11 933 B4 describes a compressed air generator comprising an air dryer with a first compressed air supply line, wherein the compressed air is guided through a drying agent, and comprising a second compressed air supply line without guiding the compressed air through the drying agent.

A compressed air supply device as mentioned above is also disclosed in EP 1 165 333 B2 within the scope of a pneumatic system comprising an air suspension installation. Besides a main bleeding line that can be shut off separately, the compressed air supply device has a high-pressure bleeding line, which has a high-pressure bleeding valve in addition to a main bleeding valve in the main bleeding line controlled pneumatically by a control valve, and which is connected in parallel to the main bleeding line. The free flow cross section of the separate high-pressure bleeding valve is smaller than that of the main bleeding valve. Such a compressed air supply device can be improved further. It has been found that, when bleeding such a compressed air supply device via the high-pressure bleeding line, dry air is bled, which is not used for the regeneration of the drying agent. This amounts to an unnecessary waste of dry air, in particular, for the case in which a flexible, quick, yet reliable actuation of the compressed air supply device suitable for above applications should be necessary with correspondingly high actuation rates.

EP 1 233 183 B1 describes a compressed air control device comprising an air dryer. The housing of the air dryer includes a pot-shaped drying container, the interior of which can be connected via the housing to a pressure medium source and also to a port element in the form of a pressure accumulator and/or an air suspension via a valve that is open to the port element. The housing has an air inlet and an air outlet for the compressed air, which, in order to fill the at least one port element, is guided in a direction of flow from the air inlet, through the drying container, and to the air outlet and, for emptying, is discharged from the housing in an opposite direction of flow from the air outlet and through the drying container and the housing. A controllable directional valve is integrated and installed in the housing of the air dryer and, during emptying, is used to inlet the air into the housing interior and the drying container. A directional valve controlling the discharge duct is controlled by at least one further controllable directional valve by means of the pressure during emptying, wherein this solenoid valve arrangement is arranged substantially outside the housing of the air dryer.

An air dryer of a compressed air device, which can be charged by a compressor, and which has a compressed air storage container and an outlet valve, is also known (see DE 32 16 329 C2). In such an air dryer, a pressure retention valve is provided in a return line between the compressed air storage container on the one hand and the container containing a drying agent as well as the outlet valve on the other hand. The outlet valve and a pressure regulator controlling the outlet valve are connected to a hollow rod by means of the container of the air dryer containing the drying agent in such a way that air can pass through. Such solutions and other previously known solutions for an air dryer have proven to be relatively bulky or require much installation space. It is desirable to design a compressed air supply device having a bleeding valve arrangement and an air dryer in a manner that is as space-saving as possible.

In all previously known solutions, in which the bleeding valve arrangement is provided in the form of a controllable solenoid valve arrangement, the pneumatic part of the solenoid valve arrangement is closed in a deactivated state of the magnetic part of the solenoid valve arrangement. That is, the previously known solutions provide a normally closed solenoid valve arrangement. With regard to the solution described in DE 35 42 974 A1, it has been found that a normally closed solenoid bleeding valve arrangement can be disadvantageous since an additional pressure-limiting or safety valve often has to be provided in order to ensure reliable function. Since, in the normally closed state, a relay valve of the solenoid valve arrangement is closed, this may lead in some cases to a valve body adhering to the valve seat, causing the switching function of the relay valve of the solenoid valve arrangement to become unreliable.

SUMMARY OF THE INVENTION

Generally speaking, it is an object of the present invention to provide an improved compression air supply device and method. This object is achieved by embodiments of the present invention, in which the disadvantages associated with a normally closed solenoid valve are overcome. In particular, a bleeding and/or drying performance of the compressed air supply device is improved.

With a normally closed solenoid valve within the scope of a bleeding valve arrangement formed as a solenoid valve arrangement (in particular, in the case of an armature or similar valve body adhering in an undesired manner to the valve seat), there is a risk that an overpressure will be produced in the compressed air supply device in an undesired manner with prolonged air conveyance of the air compression unit. In the worst case scenario, this may also encroach upon a pneumatic installation of a pneumatic system and may lead to damage in the pneumatic installation. This would be extremely disadvantageous in particular in the case of an air suspension installation. Thus, a pressure limiter for the compressed air supply device is advantageously provided, for example, in the form of a safety valve or the like. For example, the pressure limiter may be advantageously provided on a solenoid valve for direct connection of a total compressed air volume or on a relay valve. In one embodiment, the pressure limiter may be omitted. In another embodiment, a current-controlled and/or current-adjustable pressure limiter is provided with a normally open solenoid valve arrangement with considerable advantages compared to normally closed solenoid valve arrangements. The switching effort for operating a normally open solenoid valve is comparatively low. Accordingly, it is advantageous to employ a solenoid valve arrangement having a pneumatic part that is open when a magnetic part is de-energized or deactivated. Such an arrangement will also be referred to hereinafter as a normally open solenoid valve arrangement. In particular, the pneumatic part of the solenoid valve arrangement, actuatable directly via the magnetic part of the solenoid valve arrangement, is open in a bleeding line or other branch line of the compressed air supply line between a pressure-side valve port (X) and a bleeding-side and/or control-side valve port (Y, Z).

In one embodiment, the compressed air supply device comprises a solenoid valve arrangement for direct connection of a compressed air volume. The solenoid valve arrangement has either a single bleeding valve or a plurality of bleeding valves. In the case of a single bleeding valve, a compressed air volume can be connected to the device directly via the single bleeding valve. In the case of a plurality of bleeding valves, a primary bleeding valve and a secondary bleeding valve can be provided. The primary bleeding valve and the secondary bleeding valve can be connected simultaneously in succession or individually as required in order to bleed a compressed air volume. Such a directly controlled bleeding solenoid valve arrangement is, in particular, free from a control valve. It may have a single solenoid valve or a plurality of solenoid valves connecting a compressed air volume, at least one of the valves or a specific number or all of the valves normally being open. In particular, normally open individual-armature or double-armature solenoid valves are suitable.

It should be appreciated that embodiments of the present invention are not limited to directly controlled solenoid valve arrangements.

In another embodiment, the compressed air supply device comprises an indirectly controlled, normally bleeding solenoid valve arrangement for indirect connection of a compressed air volume, with which a control valve exposed to an overall pressure is provided in order to control a relay valve. In the case of such a normally bleeding arrangement, the pneumatic part of the control valve is open in a deactivated or de-energized state of the magnetic part of the control valve, and therefore, the relay valve is in a piloted state. In the event of an application of pressure, the relay valve opens immediately, and has consequently been proven to be normally open in practice. An exemplary embodiment of a normally bleeding, indirectly controlled bleeding solenoid valve arrangement is illustrated in FIG. 8. Here, an air dryer is blocked with respect to the pneumatic installation by a separate check valve.

In yet another embodiment, the compressed air supply device comprises an indirectly controlled, rapidly bleeding solenoid valve arrangement, with which a control valve exposed to a partial pressure is provided in order to control a relay valve. In the deactivated or de-energized state of the magnetic part of the control valve, the pneumatic part of the control valve is open in an indirectly controlled rapidly bleeding arrangement, and therefore, the relay valve is in a piloted state. In the event of an application of pressure, the relay valve opens immediately, and has also consequently been proven to be normally open in practice. An exemplary embodiment of a rapidly bleeding, indirectly controlled bleeding solenoid valve arrangement for a bleeding valve arrangement is illustrated in FIG. 9. Here, an air dryer is open with respect to the pneumatic installation via a regeneration throttle.

An indirectly controlled valve arrangement (rapidly or normally bleeding) may be similar to a servo-controlled valve arrangement or force-controlled valve arrangement. By contrast, a directly controlled valve arrangement has one or more directly controlled valves, which can be provided in a simple manner.

In principle, a normally open solenoid valve arrangement avoids the disadvantage of what is known as a stuck valve (i.e., a valve body adhering to the valve seat), since, with a normally open solenoid valve, the valve body is not arranged on the valve seat for the longest period of time. In addition, with constant magnetomotive force of a normally open solenoid valve, the valve seat is self-cleaning. This applies, in particular, to a directly controlled solenoid valve arrangement. The compressed air supply device is advantageously protected against the external infiltration of soiling. Separate safety valves may be largely superfluous. Even in the case of an undesirably prolonged conveyance of the air compression unit (for example, due to a stuck relay at the motor of the compressor), this conveyance reaches the atmosphere due to the normally open solenoid valve arrangement of the bleeding valve arrangement. A state of undesired air conveyance therefore cannot lead to an overpressure load of the compressed air supply device or even of the pneumatic installation. Even if a fault should occur, an air compression unit that is then no longer controllable advantageously does not convey against a preset maximum pressure, but rather only conveys against atmospheric pressure (almost completely in the case of indirectly controlled arrangements and completely in the case of directly controlled arrangements). In addition, in all the embodiments described above, there is the advantage that, when starting up the air compression unit, non-pressurized start-up is possible due to the normally open solenoid valve arrangement.

In the above-mentioned embodiments (i.e., the compressed air supply device having a directly controlled bleeding solenoid valve arrangement or the rapidly bleeding or normally bleeding indirectly piloted solenoid valve arrangements), the solenoid valve arrangement can be advantageously closed in an activated manner with each decanting of compressed air in the pneumatic installation (for example, from an accumulator to a bellows valve), where the magnetic part is activated and the pneumatic part is closed. There is thus practically no pressure loss via an air dryer. In particular, if expedient, a separation of the pneumatic installation from the compressed air supply device may thus be superfluous.

Pneumatically acting parts, such as a valve with a valve body, valve seat, valve seal, valve housing or the like, belong to a pneumatic part of a solenoid valve arrangement. Electrically and/or magnetically acting parts, such as actuation and control means with a coil, armature, coil former, control line or the like, belong to a magnetic part of the solenoid valve arrangement.

In one embodiment, a pneumatic system includes a compressed air supply device.

Within the scope of the above-mentioned embodiment of the compressed air supply device that includes a solenoid valve arrangement for direct connection of a total compressed air volume, the valve arrangement is preferably embodied in the form of a normally open, directly controlled bleeding solenoid valve arrangement free from a control valve. In one embodiment, the pneumatic part of the solenoid valve arrangement in the bleeding line may be opened between a pressure-side valve port (X) and a bleeding-side valve port (Z). For regeneration of the air dryer, a first throttle is advantageously arranged in a compressed air supply line or a branch line connected directly thereto, for example, a control branch line or the like. A second throttle is advantageously arranged in a bleeding line or a branch line connected directly thereto, for example, a bleeding branch line or the like. The nominal width of the first throttle is preferably less than the nominal width of the second throttle. This advantageously causes a maximum pressure drop to occur at the air dryer, which in turn results in a comparatively high pressure swing amplitude at the air dryer, which is particularly advantageous for the regeneration of the air dryer within the scope of pressure swing adsorption. A valve for maintaining a residual pressure is preferably arranged in the bleeding line. Within the scope of the above-mentioned first variant, a check valve and/or a relay valve is/are arranged in a bleeding line. A residual pressure function is preferably achieved via a pre-controlled relay piston of the relay valve. The residual pressure function is preferably designed to maintain a residual pressure, in particular, from 1 to 3 bar (preferably in the range from above 1 bar, in particular at least 1.5 bar) in the system (i.e., in the compressed air supply device and/or the pneumatic installation). With regard to air suspension installations, such a residual pressure has proven to be advantageous in order to maintain a sufficient residual pressure in the bellows of an air suspension installation, so as to avoid an undesired folding together or pinching of the bellows.

Within the scope of the above-mentioned embodiment of the compressed air supply device that includes an indirectly controlled, normally bleeding solenoid valve arrangement for indirect connection of a total compressed air volume, the device includes a control valve in order to control a relay valve that is exposed to a total pressure. The piloted relay valve advantageously performs a residual pressure function. A separate return valve is thus, advantageously superfluous. A pressure limiter with the relay valve can be provided advantageously via a valve spring. It should be appreciated that a pressure limiter can be provided in any of the embodiments of the present invention, even on a valve of a solenoid valve arrangement for direct connection of a compressed air volume.

Within the scope of the above-mentioned compressed air supply device comprises an indirectly piloted, rapidly bleeding solenoid valve arrangement for indirect connection of a total compressed air volume, the device includes a control valve exposed to a partial pressure for controlling a relay valve. With this arrangement, the piloted relay valve also takes on a residual pressure function. A separate check valve is advantageously unnecessary, and a pressure limiter can be provided with the relay valve via a valve spring.

In accordance with any of the embodiments of the compressed air supply device that includes an indirectly controlled, normally bleeding or rapidly bleeding solenoid valve arrangement, the pneumatic part of the solenoid valve arrangement can be opened in a branch line of the compressed air supply line between a pressure-side valve port (X) and a control-side valve port (Y) in order to pneumatically activate a relay valve in the bleeding line via the branch line.

In addition, it can be advantageous for any of the above-mentioned embodiments for the solenoid valve arrangement to include current-adjustable pressure limitation. A pressure limiter, where formed by a spring loading of a valve by means of a valve spring, can only be adjusted within specific limits. On the other hand, it may be advantageous for a sufficiently flexible supply of the pneumatic installation, such as an air suspension installation, comprising a compressed air supply device to provide a pressure limiter adjustable over a comparatively large pressure range. In accordance with one embodiment, the solenoid valve arrangement has a current-adjustable pressure limiter. Pressures for reliably filling up an accumulator in an air suspension installation may possibly be very different from pressures for filling up a bellows of an air suspension installation. A continuously current-adjustable pressure limiter enables variably and flexibly adjustable pressure limitation in a range between 10 and 30 bar. In addition, a sufficiently broad tolerance field of pressure limitations can be taken into consideration in such a range. This can be advantageous since the pneumatic part of the solenoid valve arrangement has an opening pressure that is current-adjustable via the magnetic part. Depending on the operating situation, with a normally open solenoid valve arrangement, a maximum pressure of the solenoid valve arrangement can be set by a relatively low current so as to be comparatively low, and can be set by a relatively high current so as to be comparatively high. On the one hand, a bellows of an air suspension installation can thus be protected against overload (for example, against overload above a pressure from 11 to 13 bar). An accumulator of an air suspension installation can also be protected against overload (for example, above a pressure from 20 to 25 bar). A current-adjustable pressure limiter can be advantageous over a mechanically acting pressure-limiting valve.

According to one embodiment, the compressed air supply device comprises a housing that has a number of housing regions. The compressed air supply device can thus be segmented as required into an advantageous number of regions, or constructed in a modular manner. A drive is preferably arranged in a first region. The air compression unit, that can be driven by the drive, is advantageously arranged in a second region. The air dryer and the solenoid valve arrangement are advantageously contained in a third region that is connected to the second region via a pressure source interface. The housing can be divided into the various regions by arranging the first to third regions in a U-shaped arrangement. Interfaces, such as a pressure source interface, a compressed air supply interface, or a bleeding interface, can thus preferably be arranged horizontally in the installed position of the installation, generally depending on customer requirement. It should be appreciated that the division can also be implemented by arrangement of the first to third regions in an arrangement other than a U-shaped arrangement (for example, in a Z-shaped arrangement).

The air dryer preferably has a drying container through which compressed air can flow. The drying container preferably contains a drying agent and a wall, which forms an indentation free from drying agent. Such a drying container is particularly suitable for receiving a solenoid valve arrangement at least partially, and preferably completely, in the indentation. On the one hand, the solenoid valve arrangement can thus be protected by the drying container against external influences, and on the other hand, the heat developing in the solenoid valve arrangement can advantageously be used for dryer regeneration.

A cover of the drying container is preferably arranged above the indentation. Such a cover preferably has a bleeding region divided at least in part by a seal (e.g., a molded seal) into pneumatic lines. A bleeding dome of the air dryer may thus advantageously be arranged at least in part in the region of the housing arrangement. In particular, a bleeding dome of the air dryer is arranged at least in part in the region of a cover, wherein the cover is provided above the indentation in the drying container. In addition, the drying container and/or the cover advantageously forms part of the housing arrangement in a space-saving manner. The cover can be provided advantageously with an integrated seal and/or a check valve for tightly closing the indentation and the solenoid valve arrangement contained therein. Besides a pneumatic function, similar to that of a bleeding dome with pneumatic lines, valves and ports, the cover may also have an electrical or electrical control function. In particular, the cover may be designed to provide pneumatic interfaces, such as the compressed air supply interface and the bleeding interface, or a valve in the form of a check valve. In particular, the cover may provide an electrical interface, such as a control interface.

According to one embodiment, the solenoid valve arrangement has an armature and/or valve seat formed with elastomer and/or metal. A solenoid valve of the solenoid valve arrangement preferably has a valve body or a valve seal and/or a valve seat, which contact an elastomer. A valve body and/or a valve seat may also contact a metal (an elastomer has additionally proven to be particularly advantageous for sealing a solenoid valve). On the other hand, an elastomer may tend to stick during operation (depending on the proportion of plasticizers), and in unfavorable cases, an elastomer may cause a valve body or a valve seal to stick to or freeze onto the valve seat. This may cause the armature of the solenoid valve to become blocked (i.e., as a stuck valve). In accordance with one embodiment, the combination of a normally open solenoid valve arrangement and an elastomer on the valve body, armature, valve seal and/or valve seat overcomes these disadvantages. Since, with a normally open solenoid valve arrangement, the elastomer only seals the valve during operation, a stuck valve is reliably avoided.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

Exemplary embodiments of the present invention are explained in greater detail hereinafter on the basis of the accompanying drawings, in which:

FIG. 5A is a cross-sectional view of a conventional normally closed solenoid valve arrangement in accordance with an embodiment of the invention;

FIG. 5B is a cross-sectional view of a modified normally open solenoid valve arrangement in the normally open state and a conventional normally closed solenoid valve arrangement in accordance with an embodiment of the invention;

FIGS. 6A and 6B are cross-sectional views of two further modified normally open solenoid valve arrangements in accordance with various embodiments of the invention;

FIG. 7 is a cross-sectional view of a yet further modified normally open solenoid valve arrangement in accordance with an embodiment of the invention;

Figure 1:
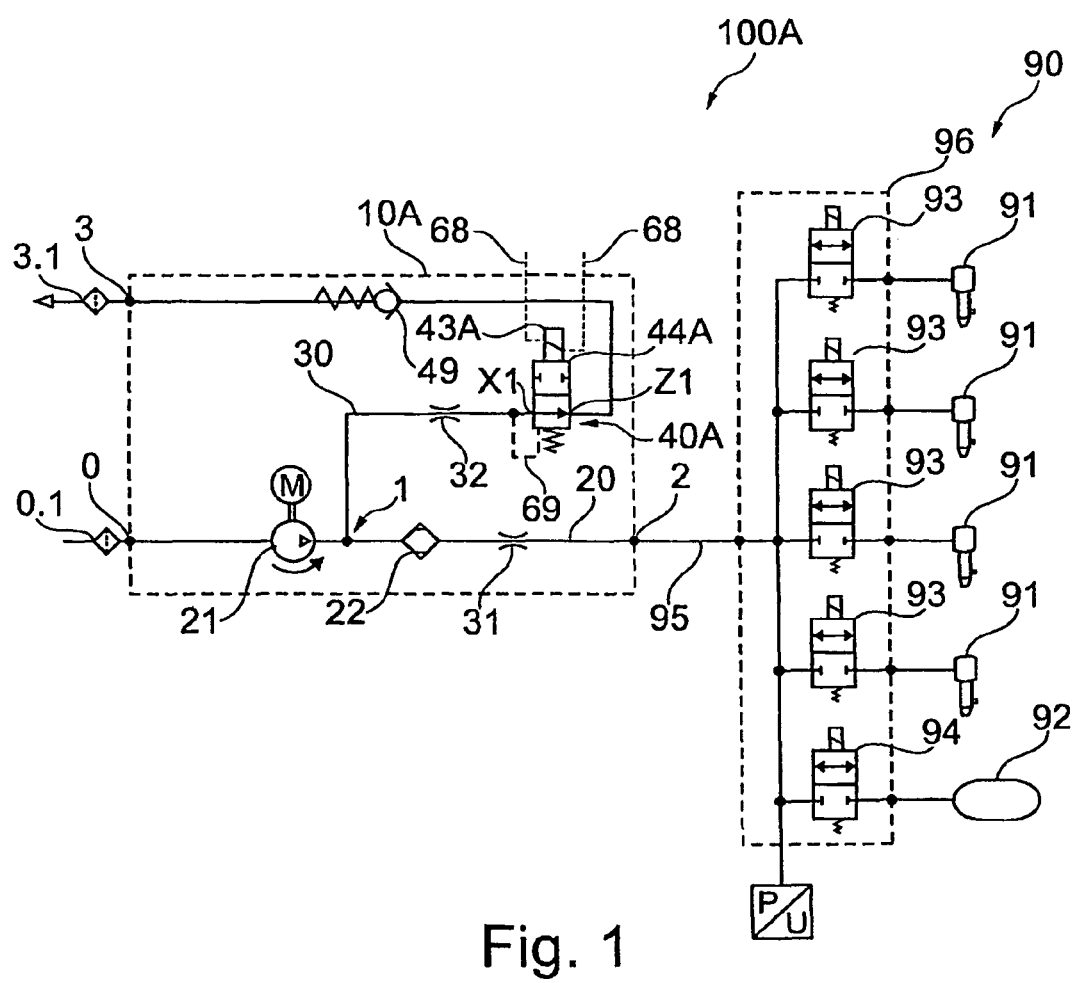
FIG. 1 is a circuit diagram of a first pneumatic system having an air suspension installation and a first compressed air supply device that includes a directly controlled bleeding solenoid valve arrangement in accordance with an embodiment of the invention.

LIST OF REFERENCE
NUMBERS/CHARACTERS

0 air supply unit
0.1 filter
1 compressed air supply unit
2 compressed air port
3 bleeding port
3.1 filter
10, 10', 10A, 10B, 10C compressed air supply device
20 compressed air supply line
21 air compression unit
22 air dryer
30 bleeding line
31 first throttle
32 second throttle
40, 40', 40", 40''', 40A, 40B, 40C solenoid valve arrangement
40.1B, 40.1C control valve
40.2B, 40.2C relay valve
43, 43A, 43B, 43C magnetic part
44, 44A, 44B, 44C pneumatic part
47 control branch line
47.1 first branch line as bleeding line
47.2 second branch line as further bleeding line
48 third branch line as yet a further bleeding line
49 check valve
49' relay pressure limiter of the relay valve 40.2B, 40.2C
49.1 first check valve
49.2 second check valve
50 housing arrangement
51 first region
52 second region
53 third region
54 compression chamber
55 piston
56 connecting rod
57 discharge valve
58 drying container
61B armature
61A valve seal element
61C valve seat
62 magnet core
63 coil former
64 armature guide tube
65 valve spring
66 duct
67 free space
68 control line
69 current-controlled pressure limiter of the pneumatic valve 44A
71 seal
72 line
73 first opening
74 throttle-forming opening
75 stop
76 second opening
90 pneumatic installation
91 bellows
92 accumulator
93 solenoid valve, level control valve for bellows
94 solenoid valve, level control valve for accumulator
95 gallery
96 valve block
100, 100A, 100B, 100C pneumatic system
400 solenoid valve
610 armature
610A valve seal element
610C valve seat
630 coil former
650 valve spring
660 duct
760 seat opening
740 duct opening
A first housing part
B second housing part
C third housing part
D seal
E0 air supply interface, interface
E1 pressure source interface, interface
E2 compressed air supply interface, interface
E3 bleeding interface, interface
F spring
G indentation
M motor
P bleeding flow
P̄ supply flow
Q compressed air flow
S control interface, interface
SE control electronics
T, T' cover
T1, T2 cover plate
W wall
X1, Xr, X2 pressure-side valve port
Y1', Y2 control-side valve port
Z1, Z1', Z2 bleeding-side valve port

DETAILED DESCRIPTION OF THE
PREFERRED EMBODIMENTS

Referring now the drawing figures, where the same reference numerals are used for corresponding elements, FIG. 1 shows a pneumatic system 100A comprising a compressed air supply device 10A and a pneumatic installation 90, here in the form of an air suspension installation. The air suspension installation has four "bellows" 91, which are each assigned to a wheel of a vehicle (not illustrated in greater detail), and also has an accumulator 92 for storing rapidly available compressed air for the bellows 91. The bellows 91 and the accumulator 92 are each connected via a normally closed solenoid valve 93, 94 (in the present case, in a valve block 96 comprising five valves) to a common pneumatic line forming a gallery 95, which forms the pneumatic connection between the compressed air supply device 10 and the pneumatic installation 90. In various embodiments, the valve block 96 may have different or fewer solenoid valves and/or solenoid valves arranged in a 2-compartment valve block. A gallery is to be understood to refer to any type of collecting line, from which branch lines to bellows 91 or a line to the compressed air supply device 10A depart.

The compressed air supply device 10A is used to operate the pneumatic installation 90 and supplies the gallery 95 thereof via a compressed air port 2. The compressed air supply device 10A also has a bleeding port 3 and an air supply unit 0 with an intake. The air suspension installation comprising the controllable solenoid valves 93, 94 is arranged downstream of the compressed air port 2 in the filling direction. A filter 3.1 and 0.1 are arranged respectively downstream of the bleeding port 3 in the bleeding direction and upstream of the air supply unit 0.

In a pneumatic connection between the air supply unit 0 and compressed air supply unit 1, the compressed air supply device 10A additionally has an air compression unit 21 in the form of a compressor, which is provided with compressed air via a motor M driven to supply the compressed air supply unit 1. An air dryer 22 and a first throttle 31, here formed as a regeneration throttle, are also arranged in a pneumatic connection between the compressed air supply unit 1 and the compressed air port 2. The filter 0.1, the air supply unit 0, the air compression unit 21, the compressed air supply unit 1, the air dryer 22, and the first throttle 31 are arranged in this sequence together with the compressed air port 2 in a compressed air supply line 20 leading to the gallery 95.

According to one embodiment, a pneumatic connection between the compressed air supply unit 1 and the bleeding port 3 of the compressed air supply device 10A includes a bleeding valve arrangement in the form of a controllable normally open solenoid valve arrangement 40A. The valve arrangement includes a magnetic part 43A and a pneumatic part 44A provided for a bleeding port 3 for the draining of air. The solenoid valve arrangement is arranged in a bleeding line 30, forming the pneumatic connection, with a second throttle 32 used here as a bleeding throttle and with the bleeding port. In other words, with the normally open solenoid valve arrangement 40A, the pneumatic part 44A is open in the deactivated or de-energized state of the magnetic part 43A. Specifically, the solenoid valve arrangement 40A is designed in the present case for the direct connection of a compressed air volume. The pneumatic part 44A, actuatable via the magnetic part 43, in the bleeding line 30 of the compressed air supply line 20 is open between a pressure-side valve port X1 and a bleeding-side valve port Z1.

A line portion of the bleeding line 30 on the compressed air port side and forming a pneumatic chamber is advantageously connected to the compressed air supply unit 1 for pneumatic connection of the solenoid valve arrangement 40A to the compressed air supply line 20. As a result, compressed air that is removed before the air dryer 22 (i.e., undried air) is bled when the compressed air supply device 10A is bled via the bleeding line 30.

It can be seen from FIG. 1 that the compressed air supply device 10A is formed with a solenoid valve arrangement 40A in the form of a directly controlled bleeding solenoid valve arrangement without a control valve, and that a direct connection of the total compressed air volume is possible via a control line 68. In the present case, the solenoid valve arrangement 40A provides a single solenoid valve as a bleeding valve. A control valve is not provided. This allows rapid and flexible bleeding of the pneumatic installation 90 or bleeding of the compressed air supply device 10A without an additional control valve. Components and installation space can thus be advantageously saved. There are also advantageously no considerable demands on a minimum pilot pressure for operation of the compressed air supply device 10A. In principle, a multiplicity of operating states, even in respect of the air dryer 22, can thus be implemented in an improved manner for a compressed air supply device, since the solenoid valve arrangement 40A is formed with a single normally open solenoid valve, which is activated via the control line 68.

More specifically, the operating principle of the compressed air supply device 10A is as follows, presented with reference to FIG. 1. The compressed air supply unit 1 is supplied with compressed air by drawing in air via the filter 0.1 and the air supply unit 0, since the air compression unit 21 driven via the motor M compresses drawn-in air. The pneumatic installation 90 in the form of the air suspension installation is supplied with compressed air from the compressed air supply unit 1 via the air dryer 22 and the first throttle 31. To this end, the compressed air supply line 20 of the compressed air supply device 10A is connected via the compressed air port 2 to the gallery 95 of the pneumatic installation 90.

When reaching the accumulator end pressure in the pneumatic installation 90, in the present case, in a pressure range from approximately 15 to 20 bar in the accumulator and 5 to 10 bar in the bellows, the compressed air supply device 10A is bled. For the solenoid valve arrangement 40A, a greater nominal width dimension is provided for the second throttle 32 than for the first throttle 31 so that a maximum pressure swing amplitude can be produced for the regeneration of the air dryer. This allows advantageous bleeding of the compressed air supply device 10A and/or regeneration of the air dryer 22.

To fill an accumulator 92, the bleeding line 30 is thus firstly closed by energizing the solenoid valve arrangement 40A using a control current in order to enable a pressure build-up in the accumulator 92. In the present case, the compressed air supply device 10A can be bled once the accumulator end pressure has been reached, that is, once the "accumulator filling end" has been reached, by disconnecting the control current for a magnetic part 43A of the normally closed solenoid arrangement 40A. Bleeding can occur without difficulty in the case of vehicle lowering during normal operation by means of the solenoid valve arrangement 40A that is already open (since it is normally open). Here, a regeneration of the air dryer 22 is expediently ensured by means of a suitable pressure drop over the air dryer 22, and a flexible and quick bleeding is expediently ensured by means of the design of the nominal width of the throttles 31, 32.

The compressed air supply device 10A additionally advantageously has a check valve 49, which in the present case, has a residual-pressure-maintaining function. On the one hand, the check valve 49 is used to prevent an entry of contaminants into the compressed air supply device 10A in addition to the filter 3.1. In addition, the residual-pressure-maintaining function of the check valve 49 is used to maintain a minimum pressure in the compressed air supply device 10A. Due to the compressed air supply line 20 that is open to the gallery 95 via the throttle 31, the residual pressure is also present for the pneumatic installation 90 in the form of the air filter installation. This residual pressure, in the present case amounting to 1.5 bar, prevents the bellows 91 from sticking together should the compressed air supply device 10A be bled together with the pneumatic installation 90. Specifically, the walls of the bellows 91 are thus prevented from being pinched or damaged.

In addition, with a pneumatic part 44A of the solenoid valve arrangement 40A, a pressure limiter 69 of the pneumatic part 44A may advantageously be provided, with which the pressure for the solenoid valve arrangement 40A can be limited with measurement of the pressure in the bleeding line 30. A certain variability or tolerance with regard to a pressure limitation can thus be achieved, even with a relatively high operating pressure. A current-controlled pressure limiter 69 is particularly advantageous. In the present case, this is achieved since the switching point of the pneumatic part 44A can be set variably according to the amperage of a control current in the magnetic part 43A. Depending on the vehicle situation, temperature of the system or other pressure-relevant system requirements, the switching point of the pneumatic part 44A can be set in an amperage-variable manner. Due to the current-controlled pressure limiter 69, it is ensured that the gallery pressure does not exceed the static opening pressure of a level control valve formed as a solenoid valve 93 and an inner pressure of a bellows 91. In addition, a pressure measurement can also be taken in the gallery 95 or in the accumulator 92.

A bellows pressure cannot normally impress the solenoid valves 93 and assist a valve spring, since, in the present case, a bellows pressure exerts pressure via a valve armature. In the event of pressure fluctuations in the bellows 91, as may occur with poor road conditions or other dynamic influences, the solenoid valves 93 are thus prevented from being pressed. Practically only in the case of an undesirable prolonged conveyance of the air compression unit can a gallery pressure be so high that a bellows valve is pressed and the vehicle is raised undesirably. This could lead to unstable driving conditions. A pressure limiter reliably avoids such a case with installations having closed bleeding circuits. With a normally open circuit, as described in the present case, such a risk is avoided per se, however, since an air compression unit would generally convey into the atmosphere.

Figure 2:
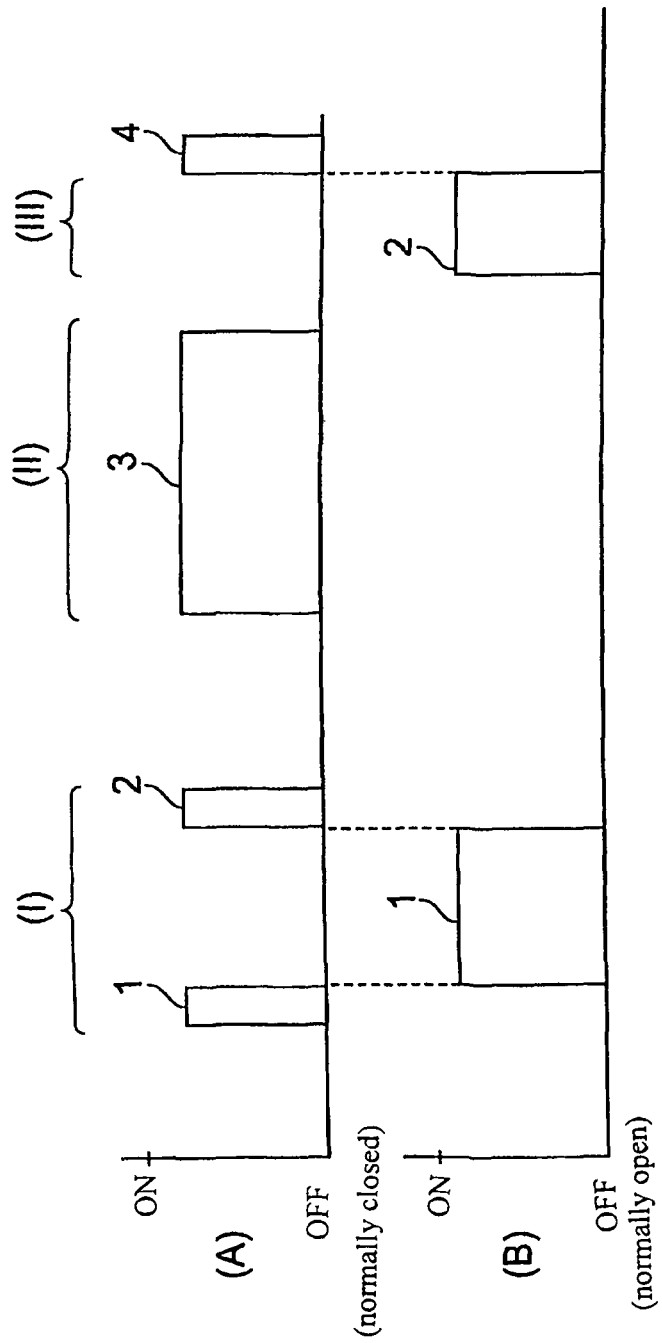
FIG. 2A is a graphic illustration of energized states of a normally closed solenoid valve arrangement in various operating states in accordance with an embodiment of the invention.
FIG. 2B is a graphic illustration of energized states of a normally open solenoid valve arrangement in various operating states in accordance with an embodiment of the invention.

FIG. 2B shows the energized state of the normally open solenoid valve arrangement 40A for three different operating modes—conveyance (I), bleeding or lowering (II), and lifting from the accumulator 92 (III). For illustrative purposes, this is contrasted as a comparison of the energized state of a normally closed solenoid valve in FIG. 2A, which is replaced by the solenoid valve 40A. The actuation state "ON" describes here an energization of a solenoid valve arrangement, and the actuation state "OFF" denotes here a de-energized state of a solenoid valve arrangement.

As shown in FIG. 2B for conveyance (I), the normally open solenoid valve arrangement 40A is energized, that is, from the start of conveyance to the end of the filling process of the bellows 91 or of the accumulator 92 (no. 1). For the operating state (II), that is, for bleeding or lowering, there is no energization of the normally open solenoid valve arrangement 40A; by opening one of the solenoid valves 93, 94, the pneumatic installation 90 in the form of the air suspension installation can be bled by the normally open solenoid valve 40A and the vehicle body can thus be lowered. The vehicle body can be raised via compressed air stored in the accumulator 92 by opening the solenoid valve 94 and possibly all or some of the solenoid valves 93. The normally open solenoid valve arrangement 40A is energized, that is, closed, for this operating state (III) (no. 2).

FIG. 2A shows, by way of comparison, the energization of a conventionally normally closed solenoid valve arrangement. It can be seen that, for the operating state (I), a normally closed solenoid valve arrangement of this type normally has to be opened twice (no. 1 and no. 2), specifically at least in the case of bleeding before conveyance if a residual pressure is to be bled, and also in the case of bleeding after conveyance at the end of the filling process, unless excessive pressure potential may otherwise occur, for example, as a result of a pressure exchange between components of a pneumatic system. A normally closed solenoid valve arrangement must also be opened for an operating state (II) by means of lasting energization (no. 3) in order to enable a bleeding or a lowering of the vehicle body. Lastly, in an operating state (III) after lifting of a vehicle body using compressed air from an accumulator 92, a normally closed solenoid valve arrangement has to be energized, that is, opened, once in order to bleed the compressed air supply device (no. 4).

Consequently, the clock rate of an actuation or activation, that is, energization or switching frequency, of the normally open solenoid valve arrangement 40A compared to a normally closed solenoid valve arrangement is lower when all operating states (I), (II) and (III) are considered together. It has been found that this is relevant, in particular for compressed air supply devices that are to be actuated quickly and in a flexible manner, for example, for use in an off-road vehicle or an SUV. For frequently changing operating states (I), (II), and (III), a compressed air supply device 10A with a normally open solenoid valve arrangement 40A has proven to be particularly advantageous. In addition, with the normally open solenoid valve arrangement 40A, a long-lasting contact between the valve body and the valve seat is advantageously prevented in order to avoid stuck valves.

Figure 3:
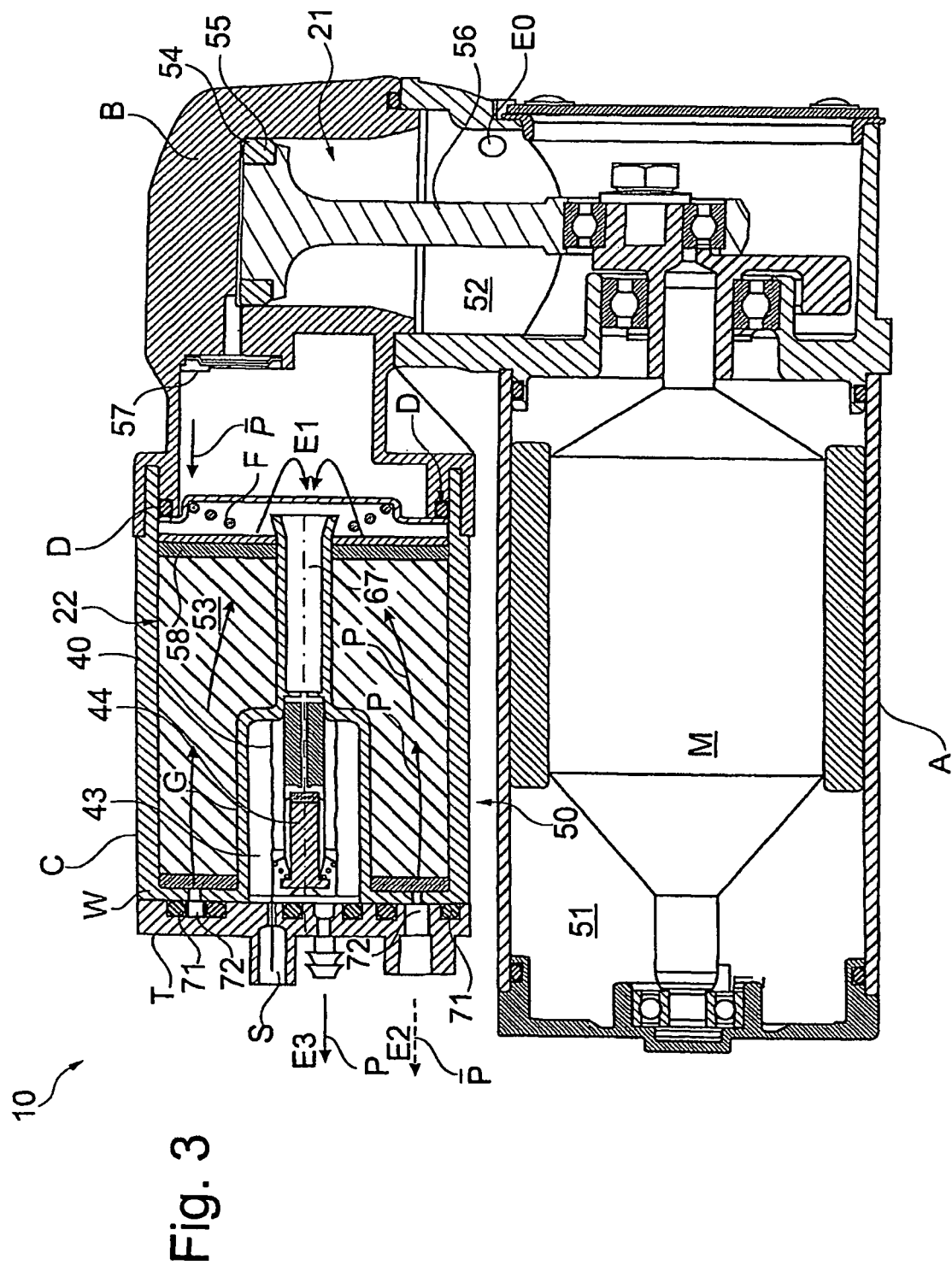
FIG. 3 is a cross-sectional view of a compressed air supply device having a normally open solenoid valve arrangement in accordance with an embodiment of the invention.
Figure 4:
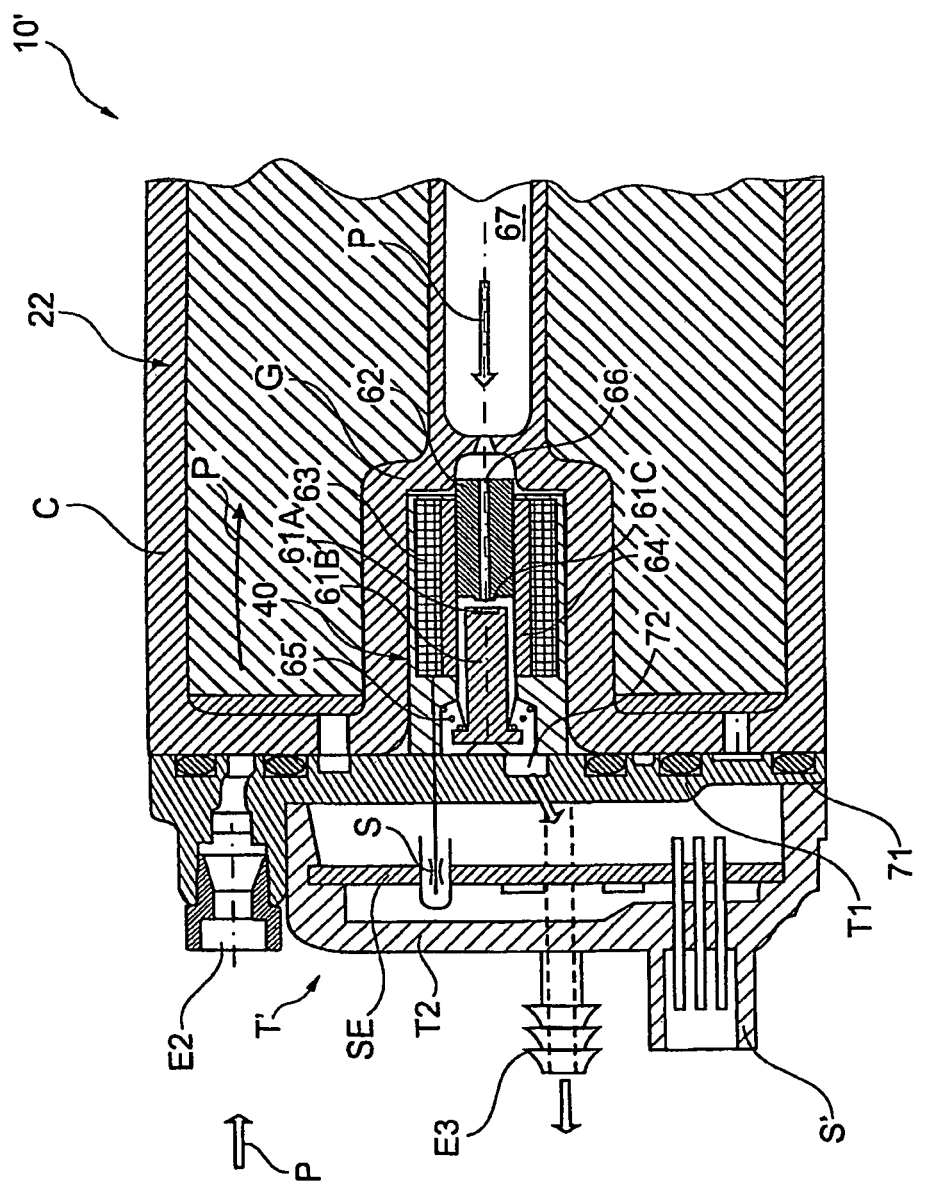
FIG. 4 is an enlarged view of the solenoid valve arrangement in FIG. 3 in a normally open state in accordance with an embodiment of the invention.

In a preferred embodiment, the compressed air supply device 10, 10A, 10B, 10C is formed with a housing arrangement 50, which has a number of regions, wherein a motor M is arranged in a first region 51 and/or the air compression unit 21 that can be driven by the motor M is arranged in a second region 52 and/or the air dryer 22 and the solenoid valve arrangement 40, 40A, 40B, 40C are arranged in a third region 53 connected to the second region 52 via a pressure source interface E1. FIGS. 3 and 4 specifically show two preferred embodiments of a compressed air supply device 10, 10' comprising a normally open solenoid valve arrangement 40. The compressed air supply devices 10, 10' are each formed with a housing arrangement 50, which has a number of housing regions. A drive in the form of a motor M is arranged in a first region 51, and the air compression unit 21 that can be driven by the motor M is arranged in a second region 52. The air compression unit 21 for this purpose has a piston 55, which is movable to and fro in the compression chamber 54 and which is driven by the motor M via a shaft and a connecting rod 56. Air is fed to the compression chamber 54 via an air supply unit interface E0 of the above-mentioned air supply unit 0. Compressed air located at the output of the compression chamber 54 is transferred via a discharge valve 57 or the like to a pressure source interface E1 for the above-mentioned compressed air supply unit 1. The compressed air is delivered in a third region 53 of the compressed air supply device 10, 10'. The third region 53 contains the air dryer 22 comprising a drying container 58 and the normally open solenoid valve arrangement 40 (illustrated on a larger scale in the compressed air supply device 10' in FIG. 4). The housing regions are assigned corresponding housing parts A, B, C, which are optionally sealed with respect to one another via one or more seals D. With the compressed air supply devices 10, 10', a housing part C and a cover T, or, in FIG. 4, a cover T' closing the housing part C on the base side is assigned to the third region 53.

The air dryer 22 advantageously has a drying container 58, through which compressed air can flow. The drying container contains a drying agent and includes a wall W that forms an indentation G free from the drying agent, wherein the solenoid valve arrangement 40, 40A, 40B, 40C is arranged at least in part, preferably completely, in the indentation G. The third housing part C is formed in the present case by a wall W of the drying container 58 filled with drying granulate and by the cover T, or in FIG. 4 the cover T'. The drying granulate is held at pressure by a spring F in the drying container 58. The wall W in turn, at the base side of the drying container 58, forms an indentation G arranged symmetrically, that is, in the present case parallel and centrally, with respect to an axis of the drying container 58, the indentation being free from drying agent. The bleeding valve arrangement in the form of the normally open solenoid valve arrangement 40 is housed in the indentation G symmetrically with respect to the axis of the drying container 58. At the base side, the cover T, T' tightly closes the indentation G together with the solenoid valve arrangement 40 located therein.

A cover T, T' of the drying container 58 is advantageously arranged above the indentation (G) and has a bleeding region at least partly divided into pneumatic lines 72 by a seal 71. In the present case, the cover T, T', as part of the housing arrangement 50 of the compressed air supply device 10, not only receives seals 71 to tightly close the housing part C of the compressed air supply device 10, 10'. In addition, lines 72, which connect to corresponding apertures in the drying container 58 and are guided in the cover T, T', protrude into the cover T, T' as part of a bleeding dome of the air dryer 22. To form the lines 72, the seals 71 in the cover T, T' are designed as a molded seal. In addition, the cover T, T' is interrupted by interfaces, wherein E2 forms a pressure source interface at the compressed air port and E3 forms a bleeding interface at the bleeding port 3 of the compressed air supply device 10. The control interface S is used for connection to the above-mentioned control line 68 of the solenoid valve arrangement 40.

In the present case, the normally open solenoid valve arrangement 40 (both the arrangement of the pneumatic part 44 and of the magnetic part 43 of the solenoid valve arrangement 40) is formed in a common valve housing, that is, in a modular manner, and is arranged in the indentation G in the wall W of the housing part C. With development of the concept of the invention, a particularly compact arrangement of the normally open solenoid valve arrangement 40 in the drying container 58, that is, specifically in the indentation G formed thereby, can be achieved. In particular, a valve seat and a valve body of the pneumatic part are arranged in the indentation G in this case. The solenoid valve arrangement 40 is thus housed in the drying container 58 in a manner particularly well protected against external influences.

On the whole, a space-saving compressed air supply device 10, which additionally enables horizontal interfaces, namely S, E0, E1, E2, E3, is provided as a result of the U-shaped arrangement of the first, second, and third region 51, 52, 53 and of the assigned first, second, and third housing parts A, B, C. In addition, a weight saving is achieved since the outer contour of the drying container 58 and of the cover T, T' of the air dryer 22 is used as part C of the housing arrangement 50.

FIG. 4 shows an enlarged illustration of an embodiment of the compressed air supply device, modified by the cover T', of the air dryer 22 described above with respect to FIG. 3 in a compressed air supply device 10', wherein like reference signs are used for like or similar parts or for parts having like or similar function. In the present case, the arrows show a bleeding flow P from the gallery 95 during bleeding, that is, in the normally open state of the solenoid valve arrangement 40. As explained, this is arranged completely in an indentation G in the drying container 58, the indentation being formed by the wall W of the housing part C. In the present case, the magnetic part 43 is formed by a coil former 63 and a single armature 61B, which can be activated by the coil former 63 in the event of energization (to close the solenoid valve arrangement 40). It can be seen that the armature 61B, when the coil former 63 is de-energized, is fixed by a valve spring 65 such that a valve seal element 61A attached on the armature 61B is lifted from a valve seat 61C assigned to the valve seal element 61A. The compressed air can escape as a bleeding flow P through a duct 66 forming the throttle 32 in a magnet core 62 and past the armature 61B (that is, flowing past the coil former 63) through a bleeding dome guided in the cover T', specifically the ducts 72, to the bleeding interface E3 of the bleeding port 3. The armature 61B is arranged in a non-magnetic armature guide tube 64. As shown in FIG. 4, the solenoid valve arrangement 40 in the indentation G in the drying container 58 forms a duct, through which air can flow, through the drying container 58, which has an installation-free free space 67 arranged before the solenoid valve arrangement 40, wherein the free space 67 and the solenoid valve arrangement 40 are arranged axially relative to one another. The free space 67 is therefore part of the above-described bleeding line 30.

In the present case, the check valve 49, as explained in greater detail above with reference to FIG. 1, having a residual pressure function is also incorporated into the cover T'. The check valve 49 is incorporated together with a part of the bleeding dome in the cover T' in a flow-optimized manner such that the check valve is beneficial for flexible and rapid bleeding and aerating of the compressed air supply device 10 or of the pneumatic installation 90. The cover T' is formed in a modular manner in the present case. To this end, it has a first cover plate T1 for presentation of a pneumatic functionality (specifically the ducts 72, the molded seal 71 and the interfaces E2, E3). The cover T' also has a second cover plate T2 for presentation of an electrical and/or electrical control functionality (specifically the interface S and a control electronics unit SE, which connects the interface S to the port S').

FIG. 5B shows a normally open position of the solenoid valve arrangement 40', similar in principle to FIG. 6B and FIG. 7, with a symbolically illustrated compressed air flow Q. Here, the same reference signs in FIG. 4 have been used for identical or like parts or parts having identical or similar function. The flow Q in FIG. 5B guided in the direction of the bleeding flow P signifies a compressed air flow from the duct 66 to an opening 74 on the magnet core 62 forming the throttle 32 and to two first openings 73 connected to the lines 72 visible in FIG. 4. Here, the armature 61B is pressed against a stop 75 as a result of the spring force of the valve spring 65 (here a compression spring) when the coil former 63 is de-energized. When the coil former 63 is energized, the armature 61B is drawn against the spring force of the valve spring 65 into the coil former 63 so that the valve seal element 61A comes to lie on the valve seat 61C and closes the normally open solenoid valve arrangement 40'. Here, a second opening 76 is released in the stop 75 between the two first openings 73. As shown in FIG. 5A, the operating principle for the example of a normally closed solenoid valve 400 is different. Here, the armature is pressed via its valve seal element 610A by the spring force of the valve spring 650 against the arrangement formed from a single seat opening 760 and the valve seat 610C and thus closes in the normal state, that is, the normally closed solenoid valve arrangement 400 closes when the coil former 630 is de-energized. When the coil former 630 is energized, the armature 610 is drawn into the coil former 630 against the spring force of the valve spring 650 so that the valve seal element 610A is raised from the valve seat 610C and releases the seat opening 760. The compressed air of the flow Q can thus flow from a duct 660 into the duct opening 740 forming a throttle, past the armature 610, and through the seat opening 760.

In contrast to FIG. 6B (identical to FIG. 5 (B), FIG. 6A shows a normally open solenoid valve arrangement 40", with which a pressure built up by the compressed air again of a flow Q in the direction of the bleeding flow P is arranged beneath the armature 61 in the energized, closed state. With the normally open solenoid valve arrangement 40' shown in FIG. 6B and FIG. 5B, a pressure of the compressed air in the energized, closed state is arranged above the armature 61B. To this end, FIG. 6A shows a substantially mirrored arrangement of the components of the solenoid valve arrangement 40" compared to the solenoid valve arrangement 40'. The modes of operation of the valve spring 65 in the form of a compression spring and the mode of operation of the coil former 63 have already been described with respect to FIG. 5B.

In principle, the solenoid valve arrangement 40, 40A, 40B, 40C advantageously has an armature 61B and/or valve seat 61C formed with elastomer and/or metal. FIG. 7 shows a modification, which is largely similar in terms of construction to FIG. 5B and FIG. 6B and is practically identical in terms of function, of a normally open solenoid valve arrangement 40''', with which, in contrast to FIG. 5B and FIG. 6B, a valve seat 61C is formed as a metal stop, which is arranged opposite a metal valve seal 61A. Here, the valve seal 61A and the valve seat 61C are bent in a curved manner and, with matched shaping of the faces of the valve seal 61A and of the valve seat 61C, manage without an elastomer valve seal element, as is shown in FIG. 6B and FIG. 5B.

Figure 8:
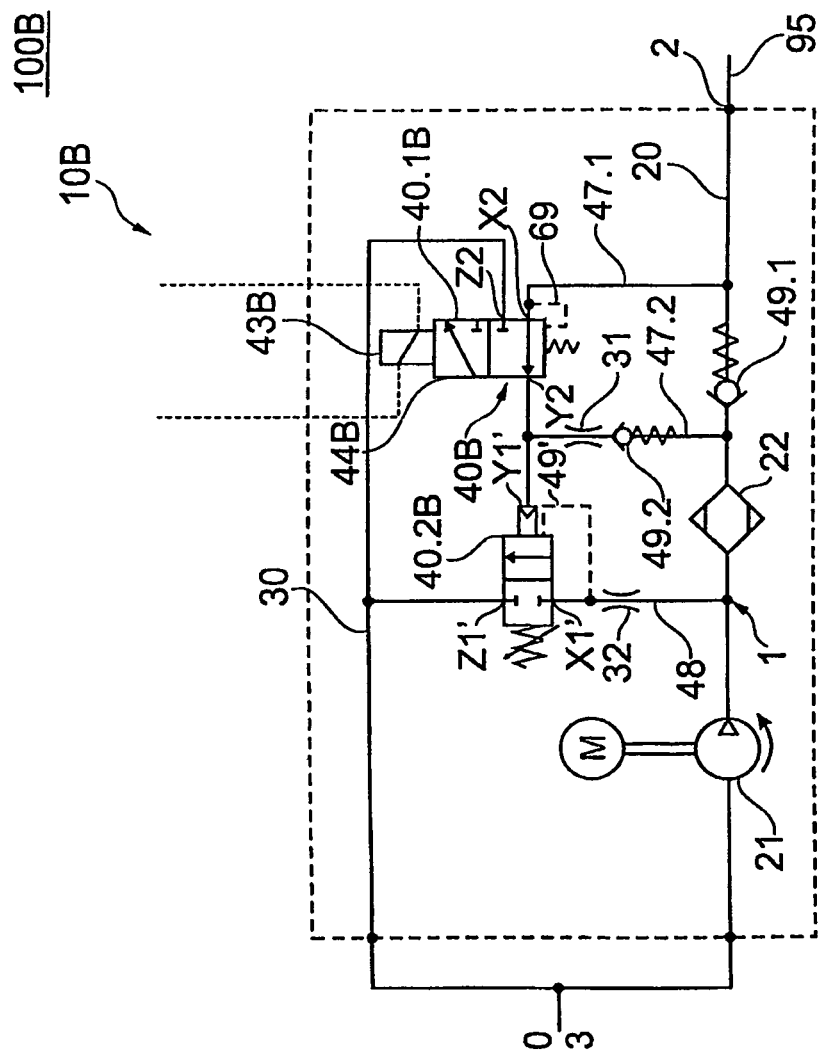
FIG. 8 is a circuit diagram of a second pneumatic system having an air suspension installation and a second compressed air supply device that includes a normally bleeding indirectly controlled solenoid valve arrangement in accordance with an embodiment of the invention.
Figure 9:
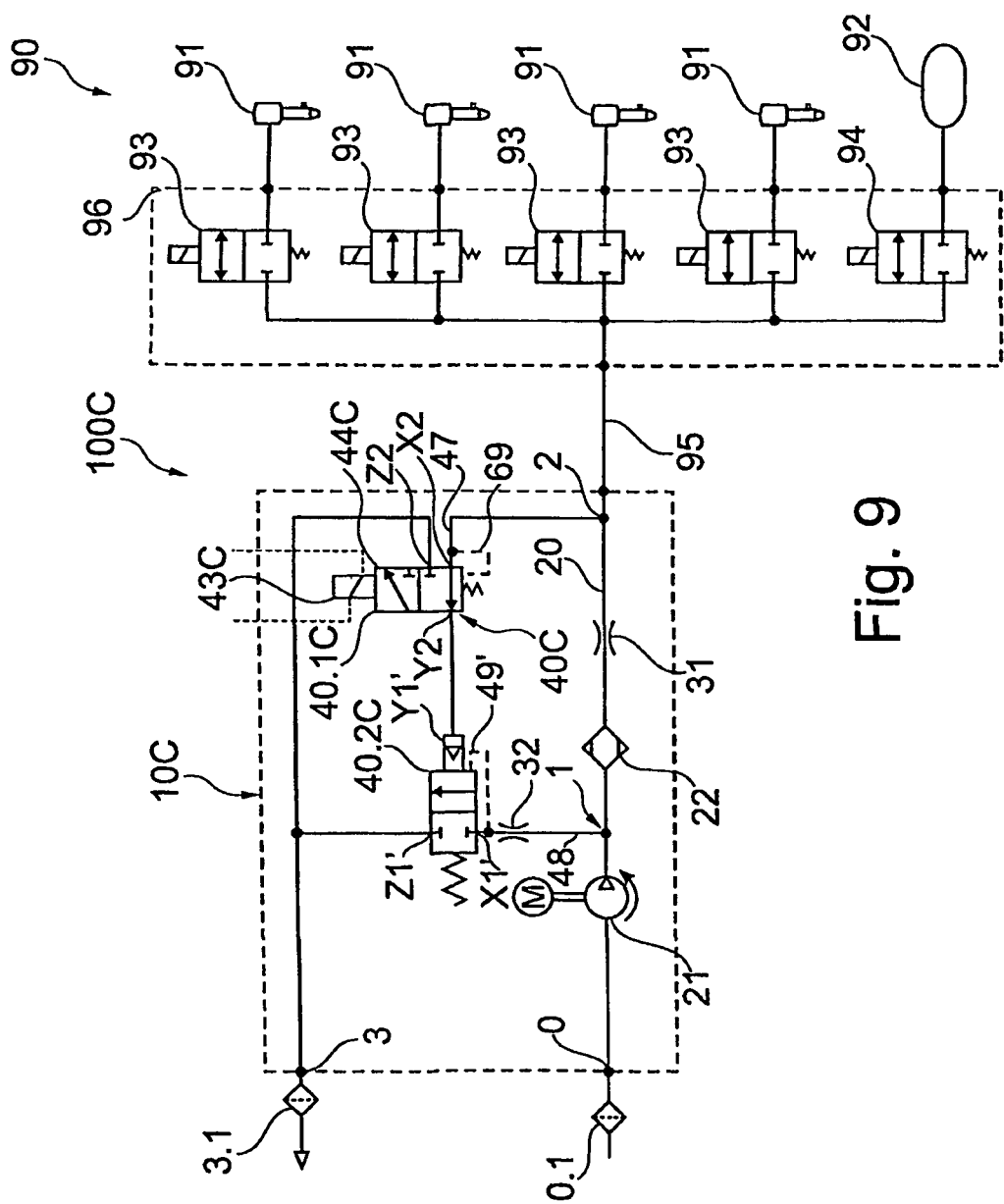
FIG. 9 is a circuit diagram of a third pneumatic system having an air suspension installation and a third compressed air supply device that includes a rapidly bleeding indirectly piloted solenoid valve arrangement in accordance with an embodiment of the invention.

FIGS. 8 and 9 show two preferred embodiments of a solenoid valve arrangement 40B, 40C, in which a relay valve 40.2B, 40.2C is arranged in the bleeding line 30 to maintain a residual pressure. In the present case, the relay valve 40.2B, 40.2C is designed to hold a residual pressure in the range up to 1 bar, in particular a residual pressure up to 3 bar. The compressed air supply device 10B, 10C ensures that the pneumatic part 44B, 44C, which is directly actuatable via the magnetic part 43B, 43C, is open in a branch line—the compressed air supply line 20—(in accordance with FIG. 9 in a control branch line 47, or in accordance with FIG. 8 in a first branch line 47.1) between a pressure-side valve port X2 and a control-side valve port Y2 of the branch line. In the present case, the pneumatic part 44B, 44C is formed in the manner of a 3/2 valve in the solenoid valve arrangement 40B, 40C and is open in the branch line of the compressed air supply line 20 for pneumatic activation of a relay valve 40.2B, 40.2C in the bleeding line 30. In the deactivated or de-energized state of the magnetic part 43B, 43C of a control valve 40.1B, 40.1C, the relay valve 40.2B, 40.2C is in a piloted state, such that the relay valve 40.2B, 40.2C opens between a pressure-side valve port X1' and a bleeding-side valve port Z1' with application of pressure.

Specifically, FIG. 8 (for a pneumatic system 100B not illustrated in greater detail comprising the known pneumatic installation 90) shows a compressed air supply device 10B, in which like reference signs are again used for identical or similar parts or parts having identical or similar function. In particular, the differences from the compressed air supply device 10A of FIG. 1 and a compressed air supply device 10C in the subsequent FIG. 9 will be explained hereinafter.

The present compressed air supply device 10B provides a solenoid valve arrangement 40B, which is normally open and is switched in the manner of what is known as a normally bleeding pre-controlled arrangement. As shown in FIG. 8, the solenoid valve arrangement 40B consists of a normally open solenoid valve as the control valve 40.1B comprising a magnetic part 43B and a pneumatic part 44B. The relay valve 40.2B is part of the pneumatic part 44B. The total pressure of the air pressure volume in the compressed air supply line 20 is applied to the control valve 40.1B, which forwards this as a pilot pressure to the relay valve 40.2B as a normally open embodiment, that is, in the deactivated or de-energized state of the magnetic part 43B. This arrangement can be produced with relatively small nominal widths with the control valve 40.1B and yet relatively large nominal widths of the throttle 32 compared to the throttle 31 with the relay valve 40.2B in order to bleed a compressed air volume from the compressed air supply line 20 for bleeding 3 via the branch line 48. In addition, a sufficiently high pressure swing amplitude is ensured for regeneration of the air dryer 22. Due to the throttle 31, connected in parallel, in the second branch line 47.2 designed as a further bleeding line, the total pressure of the de-energized, open control valve 40.1B is applied in the first branch line 47.1 designed as a bleeding line and therefore also to the relay valve 40.2B. The compressed air supply line 20 and the second branch line 47.2 are protected by a first check valve 49.1. The total airflow during a bleeding process is thus diverted into the bleeding line 30 by the control valve 40.1B via the throttle 31 and by the second check valve 49.2 and also by the air dryer 22 and the throttle 32 and the relay valve 40.2B then open in a piloted manner. If the gallery 95 is open, the relay valve 40.2B immediately switches as a result of the control pressure applied to the further control-side valve port Y1'; the control pressure is conveyed to the further control-side valve port Y1' via an open pressure-side valve port X2 and an open control-side valve port Y2 of the normally open control valve 40.1B in the first branch line 47.1. The relay valve 40.2B thus opens the third branch line 48, designed as yet a further bleeding line, with respect to the bleeding line 30 for bleeding 3. On the other hand, the second check valve 49.2 prevents the activation of the relay valve 40.2B via the second branch line 47.2 during conveyance of an airflow from the compressed air supply unit 1 to the compressed air port 2 when the control valve 40.1B is likewise closed, that is, energized. The first check valve 49.1 also shuts off the gallery 95 with respect to the air dryer 22 in order to avoid undesired filling of the air dryer 22 with changing pressures in the pneumatic installation 90. Here, the control valve 40.1B is likewise closed, that is, energized.

FIG. 9 shows a pneumatic system 100C comprising a compressed air supply device 10C and pneumatic installation 90, in the present case, in the form of an air suspension installation. The same reference signs as in FIG. 1 have been used for identical or similar parts or parts having identical or similar function. In particular, reference will be made hereinafter to the differences from FIGS. 1 and 8. In contrast to the pneumatic system 100A, the pneumatic system 100C is equipped, in the present case, with a compressed air supply device 10C, in which the solenoid valve arrangement 40C (again normally open) is formed as a rapidly bleeding, indirectly piloted solenoid valve arrangement 40C. Specifically, this means that the normally open solenoid valve arrangement 40C, for indirect connection of a compressed air volume, has a control valve 40.1C exposed to a partial pressure in order to control a relay valve 40.2C. Here, the control valve 40.1C is formed in the manner of a solenoid valve comprising a magnetic part 43C and a pneumatic part 44C, wherein the relay valve 40.2C is part of the pneumatic part 44C. In the normally open state of the solenoid valve arrangement 40C, the magnetic part 43C of the control valve 40.1C is located in a deactivated or de-energized state, and the pneumatic part 44C of the control valve 40.1C is open between a valve port X2 on the pressure side and a valve port Y2 on the control side in the control branch line 47 designed as a control line. The control pressure is applied to the control-side valve port Y1' of the relay valve 40.2C in the control branch line 47. The relay valve 40.2C is thus in a piloted state. Depending on design, merely a minimal operating pressure is required to shift the relay valve 40.2C into the open state, that is, to open the valve between the pressure-side valve port X1' and the bleeding-side valve port Z1' in the third branch line 48 designed as a bleeding line. An advantage of this rapidly bleeding arrangement for the compressed air supply device 10C is that, due to the relatively small nominal width of the first throttle 31 in the compressed air supply line 20 compared to the larger nominal width of the second throttle 32 in the third branch line 48 designed as a bleeding line, merely a small partial pressure of the total pressure of a compressed air volume in the compressed air supply line 20 is necessary to control the relay valve 40.2C via the control valve 40.1C. Nevertheless, the main compressed air volume is bled via the third branch line 48 and the throttle 32 and also the relay valve 40.2C for bleeding 3. An advantage of this rapidly bleeding solenoid valve arrangement 40C with the compressed air supply device 10C is that the entire compressed air volume does not have to be guided via a single solenoid valve, but even a small partial pressure of a partial pressure air volume supplied to the control valve 40.1C via the control branch line 47 designed as a control line is sufficient. This design, similarly to a valve arrangement controlled in principle in a force-controlled or a servo-controlled manner, enables an increase in the operating pressure to a comparably high pressure level, and the switching of high compressed air volumes via the relay valve 40.2C is simultaneously made possible. The relay valve 40.2C can be designed with a relatively large nominal width. In addition, the ratio of the smaller nominal width of the first throttle 31 to the larger nominal width of the second throttle 32 is selected such that an effective regeneration of the air dryer 22 during bleeding of the compressed air supply device 10C is possible. The greater the ratio of the nominal widths, the greater is a pressure swing amplitude, in particular pressure drop, at the air dryer 22 advantageously available for regeneration.

A common feature between the compressed air supply device 10B and 10C comprising indirectly piloted bleeding solenoid valve arrangements is that a relay valve 40.2B and 40.2C of a solenoid valve arrangement 40B and 40C respectively is arranged in a "dry" line (that is, "after" the air dryer 22 in the bleeding direction), specifically in each case in the third branch line 48 leading to the bleeding line 30. There is thus advantageously a relatively low risk of a relay valve 40.2B or 40.2C being damaged, for example, frozen or the like, as a result of external influences. Furthermore, both indirectly piloted solenoid valve arrangements 40B, 40C require a minimum pilot pressure in order to be able to release a necessary minimum cross section, namely at least the cross section of the throttle 32, by means of the relay piston of the relay valve 40.2B, 40.2C. To open the relay valve cleanly, a minimum pilot pressure is required. In the case of the rapidly bleeding solenoid valve arrangement 40C, this can be built up dynamically at any rate at the throttle 31 in the event of the regeneration when draining the vehicle. With excessively low air volumes or pilot pressures, a relay piston is not connected. Here, the directly controlled solenoid valve arrangement 40A has advantages, since only a relatively low, or no, pilot pressure is necessary.

In both cases of the indirectly piloted solenoid valve arrangements 40B, 40C, the need for a separate check valve 49 in FIG. 1 is in any case omitted in principle, as is expedient with a directly controlled solenoid valve arrangement 40A in FIG. 1. Rather, a spring-loaded relay valve 40.2B or 40.2C can take on a residual-pressure-maintaining function if a suitable, possibly adjustable, valve spring is provided. In addition, with a relay valve 40.2B, 40.2C, a relay pressure limiter 49' of the relay valve 40.2B, 40.2C may advantageously be provided, with which the pressure for the relay valve 40.2B, 40.2C can be limited with measurement of the pressure in the branch line 48. A certain variability or tolerance with regard to a pressure limitation can thus be achieved, even with a relatively high operating pressure.

In contrast to the cases of indirectly piloted solenoid valve arrangements 40B, 40C, it can be found that a first throttle 31 in the compressed air supply device 10C can, in any case, be selected so as to be larger than a first throttle 31 in the compressed air supply device 10B; the reason for this lies in the fact that a main bleeding flow is not guided via the control valve 40.1C. In principle, compressed air can thus be bled or drained more quickly from a pneumatic system 100C than is the case with a pneumatic system 100B. Nevertheless, good regeneration of the air dryer 22 is achieved, even with the compressed air supply device 10C, with adaptation, preferably an increase, of the nominal width of the second throttle 32.

A pressure limiter can advantageously provide a current-adjustable pressure limitation for any of the above-described solenoid valve arrangements 40A, 40B, 40C. To this end, with a normally open solenoid valve arrangement 40A, 40B, 40C, the pneumatic part 44A, 44B, 44C may have an opening pressure that can be set via the magnetic part 43A, 43B, 43C. By setting a higher or lower current, a maximum pressure can be limited to a higher or lower value as required.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A compressed air supply device for operating a pneumatic installation, comprising:
   an air supply unit configured to supply air;
   an air compression unit configured to compress air;
   a bleeding line comprising a controllable solenoid valve arrangement and a bleeding port configured to bleed air, the solenoid valve arrangement having a magnetic part and a pneumatic part; and
   a compressed air supply line comprising an air dryer and a compressed air port, the compressed air supply line being configured to supply the pneumatic installation with compressed air, wherein the pneumatic part is disposed in a line branching from the compressed air supply line, and wherein, when the magnetic part is de-energized, the pneumatic part is open between a pressure-side valve port and a control-side valve port of the line branching from the compressed air supply line, wherein the solenoid valve arrangement comprises a relay valve configured to maintain a residual pressure up to three bar.

2. The compressed air supply device as claimed in claim 1, further comprising at least one of (i) a first throttle disposed in one of the compressed air supply line and the line branching from the compressed air supply line and (ii) a second throttle disposed in one of the bleeding line and a line branching from the bleeding line.

3. The compressed air supply device as claimed in claim 1, wherein the line branching from the compressed air supply line is a first line that, in addition to the bleeding line and a second line, branches from the compressed air supply line, and wherein the solenoid valve arrangement comprises a control valve, the control valve being configured to control the relay valve, the control valve being exposed to a total pressure of a total compressed air volume, and disposed in the first line.

4. The compressed air supply device as claimed in claim 3, wherein the control valve includes the magnetic part and the pneumatic part, wherein the pneumatic part includes the relay valve, wherein the relay valve is disposed in the bleeding line, and wherein the relay valve comprises a relay pressure limiter.

5. The compressed air supply device as claimed in claim 1, wherein the line branching from the compressed air supply line is a single line that, in addition to the bleeding line, branches from the compressed air supply line, and wherein the solenoid valve arrangement comprises a control valve, the control valve being configured to control the relay valve, the control valve being exposed to a partial pressure of a total compressed air volume, and disposed in the single line.

6. The compressed air supply device as claimed in claim 5, wherein the control valve includes the magnetic part and the pneumatic part, wherein the pneumatic part includes the relay valve, wherein the relay valve is disposed in the bleeding line, and wherein the relay valve comprises a relay pressure limiter.

7. The compressed air supply device as claimed in claim 1, wherein the line branching from the compressed air supply line is one of: (i) a single line that, in addition to the bleeding line, branches from the compressed air supply line and (ii) a first line that, in addition to the bleeding line and a second line, branches from the compressed air supply line.

8. The compressed air supply device as claimed in claim 1, wherein the pneumatic part comprises a 3/2 valve, wherein the relay valve is located in the bleeding line, and wherein the relay valve is pneumatically activated when the pneumatic part is open.

9. The compressed air supply device as claimed in claim 1, wherein the relay valve comprises a relay pressure limiter.

10. A pneumatic system comprising the compressed air supply device as claimed in claim 1.

11. The compressed air supply device as claimed in claim 1, wherein the pneumatic installation comprises a vehicle air suspension system.

12. A compressed air supply device for operating a pneumatic installation, comprising:
 an air supply unit configured to supply air;
 an air compression unit configured to compress air;
 a bleeding line comprising a controllable solenoid valve arrangement and a bleeding port configured to bleed air, the solenoid valve arrangement having a magnetic part and a pneumatic part;
 a compressed air supply line comprising an air dryer and a compressed air port, the compressed air supply line being configured to supply the pneumatic installation with compressed air, wherein the pneumatic part is disposed in a line branching from the compressed air supply line, and wherein, when the magnetic part is de-energized, the pneumatic part is open between a pressure-side valve port and a control-side valve port of the line branching from the compressed air supply line; and
 a relay valve, wherein the relay valve is open between a pressure-side valve port and a bleeding-side valve port of a line branching from the bleeding line, when the magnetic part is de-energized.

13. The compressed air supply device as claimed in claim 12, further comprising at least one of (i) a first throttle disposed in one of the compressed air supply line and the line branching from the compressed air supply line and (ii) a second throttle disposed in one of the bleeding line and a line branching from the bleeding line.

14. The compressed air supply device as claimed in claim 12, wherein the line branching from the compressed air supply line is a first line that, in addition to the bleeding line and a second line, branches from the compressed air supply line, and wherein the solenoid valve arrangement comprises a control valve, the control valve being configured to control the relay valve, the control valve being exposed to a total pressure of a total compressed air volume, and disposed in the first line.

15. The compressed air supply device as claimed in claim 12, wherein the line branching from the compressed air supply line is a single line that, in addition to the bleeding line, branches from the compressed air supply line, and wherein the solenoid valve arrangement comprises a control valve, the control valve being configured to control the relay valve, the control valve being exposed to a partial pressure of a total compressed air volume, and disposed in the single line.

16. The compressed air supply device as claimed in claim 12, wherein the line branching from the compressed air supply line is one of: (i) a single line that, in addition to the bleeding line, branches from the compressed air supply line and (ii) a first line that, in addition to the bleeding line and a second line, branches from the compressed air supply line.

17. The compressed air supply device as claimed in claim 12, wherein the pneumatic part comprises a 3/2 valve, wherein the relay valve is located in the bleeding line, and wherein the relay valve is pneumatically activated when the pneumatic part is open.

18. The compressed air supply device as claimed in claim 12, wherein the relay valve comprises a relay pressure limiter.

19. A compressed air supply device for operating a pneumatic installation, comprising:
 an air supply unit configured to supply air;
 an air compression unit configured to compress air;
 a bleeding line comprising a controllable solenoid valve arrangement and a bleeding port configured to bleed air, the solenoid valve arrangement having a magnetic part and a pneumatic part; and
 a compressed air supply line comprising an air dryer and a compressed air port, the compressed air supply line being configured to supply the pneumatic installation with compressed air, wherein the pneumatic part is disposed in a line branching from the compressed air supply line, and wherein, when the magnetic part is de-energized, the pneumatic part is open between a pressure-side valve port and a control-side valve port of the line branching from the compressed air supply line, wherein the solenoid valve arrangement comprises a current-adjustable pressure limiter, and wherein the pneumatic part is operative to open at a pressure that is current-adjustable via the magnetic part.

20. The compressed air supply device as claimed in claim 19, further comprising at least one of (i) a first throttle disposed in one of the compressed air supply line and the line branching from the compressed air supply line and (ii) a second throttle disposed in one of the bleeding line and a line branching from the bleeding line.

21. The compressed air supply device as claimed in claim 19, wherein the line branching from the compressed air supply line is a first line that, in addition to the bleeding line and a second line, branches from the compressed air supply line, and wherein the solenoid valve arrangement comprises a relay valve and a control valve, the control valve being configured to control the relay valve, the control valve being exposed to a total pressure of a total compressed air volume, and disposed in the first line.

22. The compressed air supply device as claimed in claim 19, wherein the line branching from the compressed air supply line is a single line that, in addition to the bleeding line, branches from the compressed air supply line, and wherein the solenoid valve arrangement comprises a relay valve and a control valve, the control valve being configured to control the relay valve, the control valve being exposed to a partial pressure of a total compressed air volume, and disposed in the single line.

23. The compressed air supply device as claimed in claim 19, wherein the line branching from the compressed air supply line is one of: (i) a single line that, in addition to the bleeding line, branches from the compressed air supply line and (ii) a first line that, in addition to the bleeding line and a second line, branches from the compressed air supply line.

24. The compressed air supply device as claimed in claim 19, wherein the pneumatic part comprises a 3/2 valve, and wherein a relay valve in the bleeding line is pneumatically activated when the pneumatic part is open.

25. A pneumatic system comprising the compressed air supply device as claimed in claim 19.

26. A compressed air supply device for operating a pneumatic installation, comprising:
an air supply unit configured to supply air;
an air compression unit configured to compress air;
a bleeding line comprising a controllable solenoid valve arrangement and a bleeding port configured to bleed air, the solenoid valve arrangement having a magnetic part, a pneumatic part, and a current-adjustable pressure limiter; and
a compressed air supply line comprising an air dryer and a compressed air port, the compressed air supply line being configured to supply the pneumatic installation with compressed air, wherein the pneumatic part is open when the magnetic part is de-energized.

27. The compressed air supply device as claimed in claim 26, wherein the solenoid valve arrangement is directly connected to a compressed air volume.

28. The compressed air supply device as claimed in claim 26, wherein the pneumatic part is open in the bleeding line between a pressure-side valve port and a bleeding-side valve port when the magnetic part is de-energized.

29. The compressed air supply device as claimed in claim 26, wherein the pneumatic part comprises a 2/2 valve.

30. The compressed air supply device as claimed in claim 26, further comprising at least one of (i) a first throttle disposed in one of the compressed air supply line and a line branching from the compressed air supply line and (ii) a second throttle disposed in one of the bleeding line and a line branching from the bleeding line.

31. The compressed air supply device as claimed in claim 26, wherein the solenoid valve arrangement comprises a relay valve and a control valve, the control valve being configured to control the relay valve, the control valve being exposed to a total pressure of a total compressed air volume, and disposed in a first line that, in addition to the bleeding line and a second line, branches from the compressed air supply line.

32. The compressed air supply device as claimed in claim 26, wherein the solenoid valve arrangement comprises a relay valve and a control valve, the control valve being configured to control the relay valve, the control valve being exposed to a partial pressure of a total compressed air volume, and disposed in a single line that, in addition to the bleeding line, branches from the compressed air supply line.

33. The compressed air supply device as claimed in claim 26, wherein the solenoid valve arrangement comprises a relay valve configured to maintain a residual pressure up to three bar.

34. The compressed air supply device as claimed in claim 26, wherein, when the magnetic part is de-energized, the pneumatic part is open between a pressure-side valve port and a control-side valve port in one of: (i) a single line that, in addition to the bleeding line, branches from the compressed air supply line and (ii) a first line that, in addition to the bleeding line and a second line, branches from the compressed air supply line.

35. The compressed air supply device as claimed in claim 26, wherein the pneumatic part comprises a 3/2 valve, and wherein a relay valve in the bleeding line is pneumatically activated when the pneumatic part is open.

36. The compressed air supply device as claimed in claim 26, wherein the relay valve is open between a pressure-side valve port and a bleeding-side valve port of a line branching from the bleeding line, when the magnetic part is de-energized.

37. The compressed air supply device as claimed in claim 26, wherein the relay valve comprises a relay pressure limiter.

38. The compressed air supply device as claimed in claim 26, wherein the pneumatic part is operative to open at a pressure that is current-adjustable via the magnetic part.

39. A pneumatic system comprising the compressed air supply device as claimed in claim 26 and an air suspension system.

40. The compressed air supply device as claimed in claim 26, wherein the pneumatic installation comprises a vehicle air suspension system.

41. A method for operating a pneumatic installation, the method comprising the steps of:
supplying the pneumatic installation with compressed air via a compressed air supply line, the compressed air supply line comprising an air dryer and a compressed air port; and
draining air via a bleeding line to a bleeding port, the bleeding line comprising a controllable solenoid valve arrangement having a magnetic part, a pneumatic part, and a current-adjustable pressure limiter variably adjustable via a control current in the magnetic part, wherein the pneumatic part is open when the magnetic part is de-energized.

42. The method as claimed in claim 41, further comprising, during one of (i) supplying the pneumatic installation with compressed air and (ii) compressed air redistribution in the pneumatic installation, closing the pneumatic part by energizing the magnetic part.

43. The method as claimed in claim 41, wherein, during draining air to the bleeding port, the magnetic part is de-energized.

44. The method as claimed in claim 41, wherein the pneumatic part is one of:
  disposed in the bleeding line and configured to open and close between a pressure-side valve port and a bleeding-side valve port of the bleeding line; and
  disposed in a line branching from the compressed air supply line and configured to open and close between a pressure-side valve port and a control-side valve port of the line branching from the compressed air supply line.

45. The method as claimed in claim 41, wherein the pneumatic part is operative to open at a pressure that is current-adjustable via the magnetic part.

46. The method as claimed in claim 45, further comprising continuously adjusting at least one of the current-adjustable pressure limiter and the pressure at which the pneumatic part is operative to open.

47. The method as claimed in claim 41, further comprising variably setting a switching point of the pneumatic part based on the strength of a control current in the magnetic part.

48. The method as claimed in claim 41, wherein the pneumatic installation comprises a vehicle air suspension system.

49. A compressed air supply device for operating a pneumatic installation, comprising:
  an air supply unit configured to supply air;
  an air compression unit configured to compress air;
  a bleeding line comprising a controllable solenoid valve arrangement and a bleeding port configured to bleed air, the solenoid valve arrangement having a magnetic part and a pneumatic part; and
  a compressed air supply line comprising an air dryer and a compressed air port, the compressed air supply line being configured to supply the pneumatic installation with compressed air, wherein the pneumatic part is open when the magnetic part is de-energized, and wherein the solenoid valve arrangement comprises a relay valve configured to maintain a residual pressure up to three bar.

50. The compressed air supply device as claimed in claim 49, wherein the relay valve comprises a relay pressure limiter.

51. A compressed air supply device for operating a pneumatic installation, comprising:
  an air supply unit configured to supply air;
  an air compression unit configured to compress air;
  a bleeding line comprising a controllable solenoid valve arrangement and a bleeding port configured to bleed air, the solenoid valve arrangement having a magnetic part, a pneumatic part, and a current-adjustable pressure limiter, the pneumatic part being operative to open at a pressure that is current-adjustable via the magnetic part; and
  a compressed air supply line comprising an air dryer and a compressed air port, the compressed air supply line being configured to supply the pneumatic installation with compressed air, wherein the pneumatic part is open when the magnetic part is de-energized.

* * * * *